(12) United States Patent
Brüls

(10) Patent No.: US 7,209,647 B2
(45) Date of Patent: *Apr. 24, 2007

(54) ENCODING DEVICE FOR ENCODING A PROGRAM AND RECORDING DEVICE

(75) Inventor: Wilhelmus H. A. Brüls, Eindhoven (NL)

(73) Assignee: Koninklijke Philips Electroncis N.V., Eindhoven (NL)

( * ) Notice: Subject to any disclaimer, the term of this patent is extended or adjusted under 35 U.S.C. 154(b) by 892 days.

This patent is subject to a terminal disclaimer.

(21) Appl. No.: 09/978,251

(22) Filed: Oct. 15, 2001

(65) Prior Publication Data

US 2002/0012530 A1    Jan. 31, 2002

Related U.S. Application Data

(63) Continuation of application No. 08/838,105, filed on Apr. 15, 1997.

(30) Foreign Application Priority Data

Apr. 17, 1996    (BE)    ................................ 9600331

(51) Int. Cl.
*H04N 7/26*    (2006.01)
*H04N 5/00*    (2006.01)

(52) U.S. Cl. ........................ 386/109; 386/125
(58) Field of Classification Search ................ 386/109, 386/110, 111, 112, 27, 33, 46, 52, 105, 106, 386/124, 125, 45, 40; 360/32
See application file for complete search history.

(56) References Cited

U.S. PATENT DOCUMENTS 5,680,483 A    10/1997    Tranchard .................... 348/405

FOREIGN PATENT DOCUMENTS

| EP | 000584991 A2 * | 2/1994 |
| EP | 0584991 | 3/1994 |
| JP | 02231881 | 9/1990 |

OTHER PUBLICATIONS

"Video Disc System Using Variable Bit Rate", Takehiko Saito et al., IEEE Transactions on Consumer Electronics, vol. 41, No. 3, Aug. 1995.

* cited by examiner

*Primary Examiner*—Robert Chevalier
(74) *Attorney, Agent, or Firm*—Michael E. Belk

(57) ABSTRACT

When a program of a certain duration is converted into compressed data (encoded), it is desirable for the total number of data to fit in an available data space, for example, when recorded on an information carrier. More particularly in variable bit rate compression such as a video signal via MPEG-2, this is hard to forecast. For this purpose, a recording device according to the invention comprises a compression unit (22) whose bit rate is influenced by a system controller (45) via a control input (26) during the encoding process in dependence on the remaining part of the vacant data space on the information carrier (1) and the remaining duration of the program. When parameters influencing the bit rate are set in the compression unit (22), the system controller will take the complexity of the program derived during a previously encoded part of the program into account.

32 Claims, 2 Drawing Sheets

ENCODING DEVICE FOR ENCODING A PROGRAM AND RECORDING DEVICE

CROSS REFERENCE TO RELATED APPLICATIONS

This is a continuation of application Ser. No. 08/838,105, filed Apr. 15, 1997.

FIELD OF THE INVENTION

The invention relates to the field of encoding program signals to provide compressed digital signals for the program.

The invention relates to an encoding device for encoding a signal, the signal representing a program of a predefined duration, and the encoding device including a compression unit for compressing the signal to digital data, and a system controller for controlling the compression unit for influencing the bit rate of the digital data for fitting the program in a data space which is available for the program depending on a remaining part of the data space and a remaining part of the duration of the program determined during encoding.

The invention further relates to a recording device for recording a signal on an information carrier, the signal representing a program of a predefined duration, the information carrier having a vacant data space available for recording the program, and the device including recording apparatus for recording a digital bit stream on the information carrier and apparatus for determining the predefined duration.

The invention further relates to a method of encoding a signal that represents a program of a predefined duration, the signal being converted by a compression process into digital data with a bit rate that is adjusted for fitting the program in a vacant data space which is available for the program, in which method a remaining part of the vacant memory space and a remaining part of the duration are determined during the encoding process and the bit rate is influenced by settings of the compression process depending on the remaining part of the vacant data space and the remaining part of the duration.

The invention further relates to an encoded signal obtained by implementing the method.

BACKGROUND OF THE INVENTION

Such an encoding device, recording device, method and encoded signal are known from EP-A 0584991. This document discloses a system for encoding video information in digital data for recording a video program having a known duration (such as a film) on a disc, such as a high density optical disc, for example, the so-termed DVD (Digital Video Disc). For this purpose, the system includes a an MPEG like video compression unit arranged for motion compensation, DCT (Discrete Cosine Transform), quantization and variable length coding, as is customary for MPEG. The controller of the compression unit is arranged for controlling the encoding of the video program so as to fit the program within an available data space on the disc. The data space available for storage on the disc is filled by attuning the bitrate of the coded video program to the available data space to achieve a high average picture quality. The target bitrate to be achieved is calculated from the available data space and the time to be recorded. The actual bitrate is monitored and if it deviates from the target bitrate the compression settings are adjusted. In the event of video material with a lot of activity, the applied settings will often result in a higher actual bitrate than the target bitrate. The compression settings will then be adjusted. However in the first part of the recording time with such video material a more than proportional amount of data space will be filled. Therefore an adjustment of the target bitrate during the further recording time will be required.

It is well known to provide structure to perform functions in a controller by programming the controller and to copy structures from the memory of one controller into the memory of another controller to program the other controller. Thus, a programmed controllers illustrated herein provide apparatus for programming another controller.

The above citations are hereby incoporated herein in whole by reference.

SUMMARY OF THE INVENTION

It is an object of the invention to provide apparatus for directly converting a supplied signal into compressed data, so that the total quantity of compressed data of a program that has a predefined duration fills as much as possible the available data space while the (subjective) quality during the program is substantially constant after reconstruction by decompression of the compressed data.

For this purpose, the encoding device according to the invention is characterized in that the system controller is arranged for setting the compression unit depending on a program complexity of the actual program.

For this purpose, a recording device according to the invention includes such an encoding device.

The method according to the invention is characterized in that the compression process is set depending on a program complexity of the actual program.

By implementing these measures the actual bitrate will vary less throughout the recording time. This is advantageous in that the subjective quality for the user will be more constant. By taking the complexity into account it will be prevented that, when encoding a complex program the first part uses more than half of the available bits, while the second part needs to be compressed heavily to fit in the remaining data space; while for less than average complex material the opposite (a first part unnecessarily compressed and the second part having abundant space available) is prevented. A further advantage is that, the measures avoid the last minutes of a program being heavily compressed because the available data space has almost been fully used, because more compressed data than average is generated for a selected quality for the respective program.

A further embodiment for the encoding device according to the invention is characterised in that the system controller is arranged for determining the program complexity depending on an actual bit rate during a previously encoded part of the program. This is advantageous in that the complexity of the program is determined from the actual program characteristics during an early part of the recording time and is used subsequently.

A further embodiment for the encoding device according to the invention is characterised in that system controller is arranged for establishing the program complexity depending on peaks and valleys or variation of the actual bit rate during a previously encoded part of the program. This is advantageous in that the complexity is determined not only from the actual average bitrate, but also from further properties, which allows a more accurate prediction of the compression settings.

A further embodiment for the encoding device according to the invention is characterised in that the system controller is arranged for establishing the program complexity depending on a program type. This is advantageous in that the influencing of the bit rate is effected from the start of the recording time, as the average complexity of such a program is known from the program type.

A further embodiment for the encoding device according to the invention is characterised in that the system controller is arranged for determining the duration depending on an expected duration of the program and a margin for leveling peaks in the bit rate in a last part of the program and/or for the program overrunning its time. By adding a margin to the expected duration and using this total duration for adjusting the bit rate, space is available for storing more data than expected. This is advantageous in that, for example, in a complex final scene in a video program, the bit rate need not be restricted unproportionally and in that sufficient data space remains available even if the program slightly overruns its time.

Those skilled in the art will understand the invention and additional objects and advantages of the invention by studying the description of preferred embodiments below with reference to the following drawings which illustrate the features of the appended claims.

BRIEF DESCRIPTION OF THE DRAWINGS

These and other aspects of the invention will be apparent from and elucidated with reference to the FIGS. 1 to 4, in which.

In the drawing Figures, elements corresponding to those already described carry like reference characters.

DETAILED DESCRIPTION OF THE PREFERRED EMBODIMENTS

Figure 1:
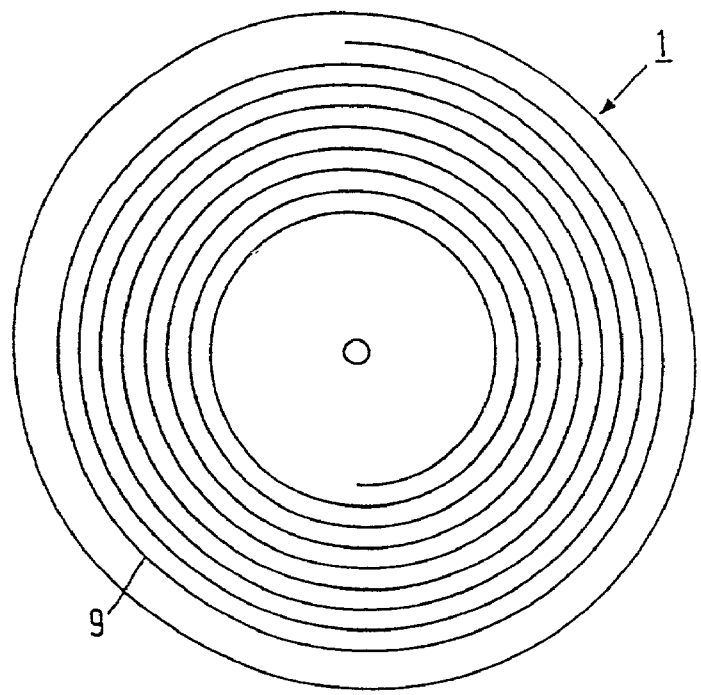
FIG. 1 shows an information carrier of a rewritable type.

FIG. 1 shows a disc-shaped information carrier 1 of a rewritable type such as, for example, a CD-E (Compact Disc Erasable). The information carrier has a track 9 intended for recording, which is arranged in a helical pattern of windings. The windings may also be arranged concentrically instead of helically. The track 9 is indicated on the information carrier by a servo pattern in which, for example, a pregroove enables a read/write head to follow the track 9 during the scanning. Furthermore, the servo pattern may contain information about the position along the track such as, for example, a time indication from the beginning of the track. The information carrier also has a pick-up layer which can be inscribed optically or magneto-optically by a device for recording information blocks in the form of patterns of marks. The CD-E have, for example, a pick-up layer of phase change material. A description of the recording and reading of a CD and the use of a track and pregroove may be found in "Principles of optical disc systems" by Bouwhuis et al, ISBN 0-85274-785-3.

Figure 2:
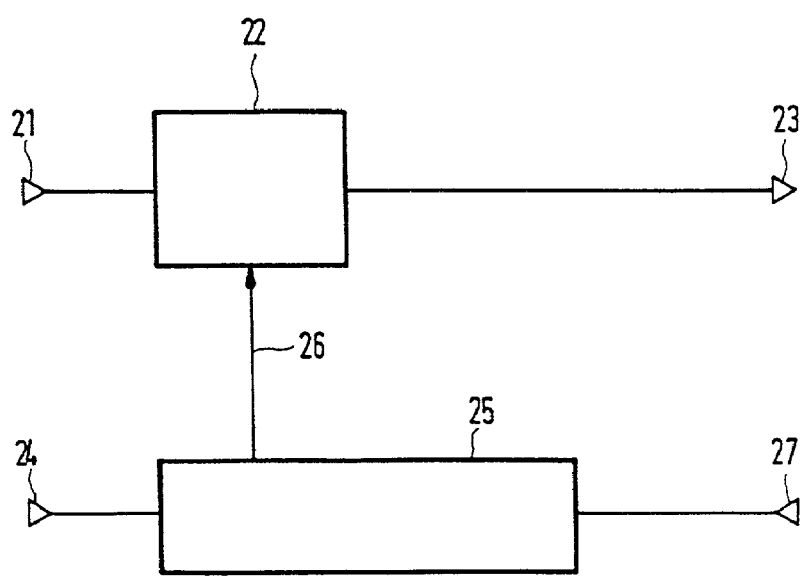
FIG. 2 shows an encoding device.

FIG. 2 shows an encoding device according to the invention. The device includes a compression unit 22 which converts a signal fed through an input 21 into an encoded signal available on an output 23. The compression unit 22 is of a customary type, such as, for example, an MPEG-2 encoder for video signals according to ISO/IEC 13818-2 or for audio signals according to ISO/IEC 13818-3. The encoded signal contains digital data having a bit rate that can be set via a control input 26. Furthermore, the encoding device also includes a system controller 25 for controlling the encoding process. The system controller is coupled to the control input 26 of the compression unit 22 and sets the compression unit to a desired bit rate through this control input. Information relating to the duration of a program to be encoded is available for the system controller 25 via a time input 24, and information relating to the data space via a data space input 27. The time information is, for example, a start and end time of a program to be set by a user, or the duration of the program. The system controller calculates from this information the data space available for the encoded signal and sets the bit rate via the control input 26 so that the program is expected to fill the available data space completely. For example, the available data space is divided by the required duration, which duration is derived from the time information presented through the time input. This results in a bit rate (bits per second) at which the available data space will be completely filled with a program to be encoded. This bit rate is then under the given circumstances the maximum possible average bit rate at which the best possible reconstruction of the program is feasible on reproduction and at which the picture quality during the program is substantially constant. The system controller includes structures 51 and 52 for adapting the settings of the compression unit depending on time information, and/or data space information which is available during the encoding process. During the encoding process, the remaining time duration is found, for example, by establishing the elapsed time with a timer or the difference between an entered end time and the actual time of a clock. The remaining data space is determined by the system controller on the basis of the information from the data space input 27, for example, on the basis of address information of the part already used of the available data space. According to the invention the system controller includes structure 53 to establish a program complexity as described below. The program complexity will be used to control the settings of the compression unit, so as, to set a higher compression for a more complex program. If modified information relating to an altered duration of the program or to a modified available data space is applied to the system controller during the encoding process, the system controller will compute a new value for the bit rate and set same. This may occur, for example, if the program is to be recorded on a tape-like information carrier via a tape recording device and the measurement of the remaining available tape length at the start of the recording process is only known in an approximation. During the recording, the remaining tape length may be computed more accurately by the tape recording device and the bit rate may be changed accordingly. It is also possible for the duration of the program to be adjusted, for example, because the user of the system enters a new end time of the program during the recording.

In a compression unit having a constant bit rate, the bit rate may be set to the computed value at the start of the program; a compression unit having a variable bit rate may be set such that a desired average bit rate will be obtained while the total quantity of data will fit in the data space. A variable bit rate compression unit is arranged for varying the bit rate depending on the contents of the signal. This is advantageous in that a (subjectively) higher, substantially constant quality of a reconstructed signal is obtained because more compressed data are generated for parts of the signal that are hard to compress, while the quantity of data generated on average continues to be restricted.

Figure 3:
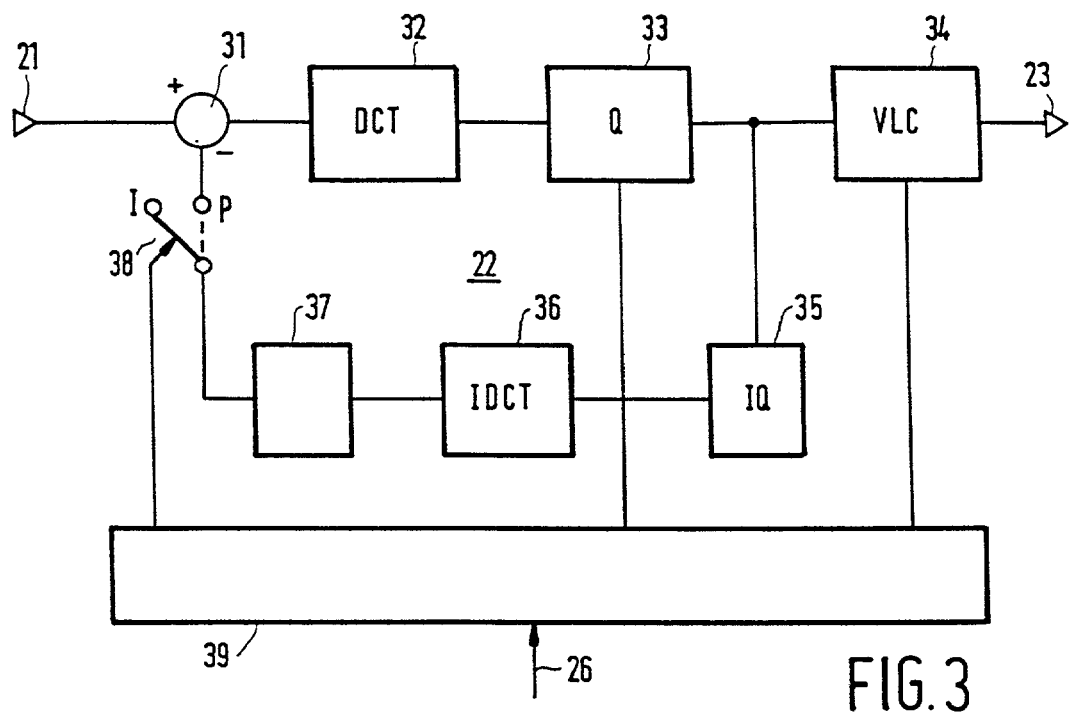
FIG. 3 shows a compression unit.

FIG. 3 gives a diagrammatic representation of a compression unit for video information as is customary for MPEG-2 and known from ISO/IEC-13818-2. A digital video signal is applied to input 21 and directed to a DCT unit 32 via a difference unit 31 which DCT unit 32 performs a Discrete Cosine Transform which divides the picture into macroblocks. The coefficients obtained are led to a Q-unit 33 and quantized with a variable dividing factor in which operation the bits of the quotient are processed, whereas the rest is discarded. The quotient bits are led to the VLC unit 34 which encodes the quotients with a variable length. In this manner, an encoded picture signal having a variable bit rate arises on output 23. The average bit rate may be influenced by a controller 39, for example, by setting the dividing factor in the Q-unit so that a larger dividing factor results in a lower bit rate. Customary dividers lie between 2 and 16. A further reduction of the bit rate necessary for a certain picture quality is obtained by transmitting groups of pictures (GOP), in which an independent I-picture is followed by several difference pictures such as, forward forecast P-pictures or bidirectional forecast B-pictures. The controller 39 decides on the basis of the activity in the presented pictures, what type of picture is generated. FIG. 3 diagrammatically shows a switch 38 operated by the controller 39 which does not pass any information for an I-picture and does pass the stored information of a reconstructed picture based on the encoded signal for a P-picture. The difference picture is then determined in difference unit 31 for which motion compensation can also be used. A reconstructed picture, as is also formed in a receiving device is formed via the IQ-unit (Inverse Quantization), the IDCT unit (Inverse Discrete Cosine Transform) in a picture memory 37. By the choice of I, B and P-pictures, the controller 39 has a further influence on the bit rate. A suitable criterion in this respect is, for example, the maximum instantaneous bit rate which is to be lower than the transmission capacity of the transport channel and a short-term average, which is to remain so low as not to exceed the buffer capacity in a receiving device.

In such a compression unit which has a variable bit rate, the quantity of generated data depends on the contents of the presented signal. If the total quantity of generated data is the same, a higher average quality of the reconstructed signal is obtained than in a system that has a constant bit rate. According to the invention, the average bit rate can be controlled by setting parameters via the control input 26 of the controller 39. The long-term average bit rate is influenced via this control input 26, for example, in that the controller adjusts the dividing factor for the choice of I/P/B pictures. Alternatively, a certain preprocessing (not shown in FIG. 3) may be used, such as noise filtering or spatial frequency content reduction, in which the filter parameters may be adjusted to influence the bit rate. The encoder device will set the long-term average bit rate so that the program is expected to fill the available data space completely. Admittedly, the average bit rate of the variable bit rate compression unit may be influenced via the control input 26, but the actually generated bit quantity also depends on the actual picture content. In consequence, it is desired to calculate periodically the remaining data space, for example, by measuring the quantity of generated data and reducing the originally available data space by this quantity. New settings are thus constantly calculated in the compression unit.

When parameters in a variable bit rate compression units preset, the encoding may start from the expected average bit rate. However, during the encoding process it is attractive to take into account the average bit rate that actually occurred during the previously encoded part of the program. This actual bitrate results from the complexity of the program, i.e. the general characteristics of the picture contents requiring an average bit rate of the actual program compressed at a predefined setting of the compression unit to achieve a predefined level of picture quality after decompression. Indeed, it may be expected that, if in a first part of a program a certain bit rate has already been generated with a certain setting of the parameters, the bit rate to be expected in a next part of the same program will be correlated therewith. The complexity of the signal contents will generally be comparable during the program, so that a better forecast of the expected bit rate later in the program is possible by taking the previously occurring bit rate relative to the used settings of the compression unit into account. The complexity calculation may be derived from a running average over a certain length of time or an average over the total of the previously encoded part, while also taking into account the variation, peaks and valleys or a variance of the bit rate for which a higher bit rate may be used in the event of a large irregularity. In a further embodiment the complexity information of program types is provided in the system controller, e.g. in a table in a memory 50. A general average bit rate over a large number of programs for a number of program types may be established beforehand or during previous encoding sessions, such as "sport" (high complexity) or "talk show" (low complexity). The program type may be known to the source of the program to be encoded, may be indicated in the signal or may be entered by the user. The system controller can use the complexity information from the memory or there may be calculated a weighted average of the bit rate that actually occurs and the complexity information from the memory.

Figure 4:
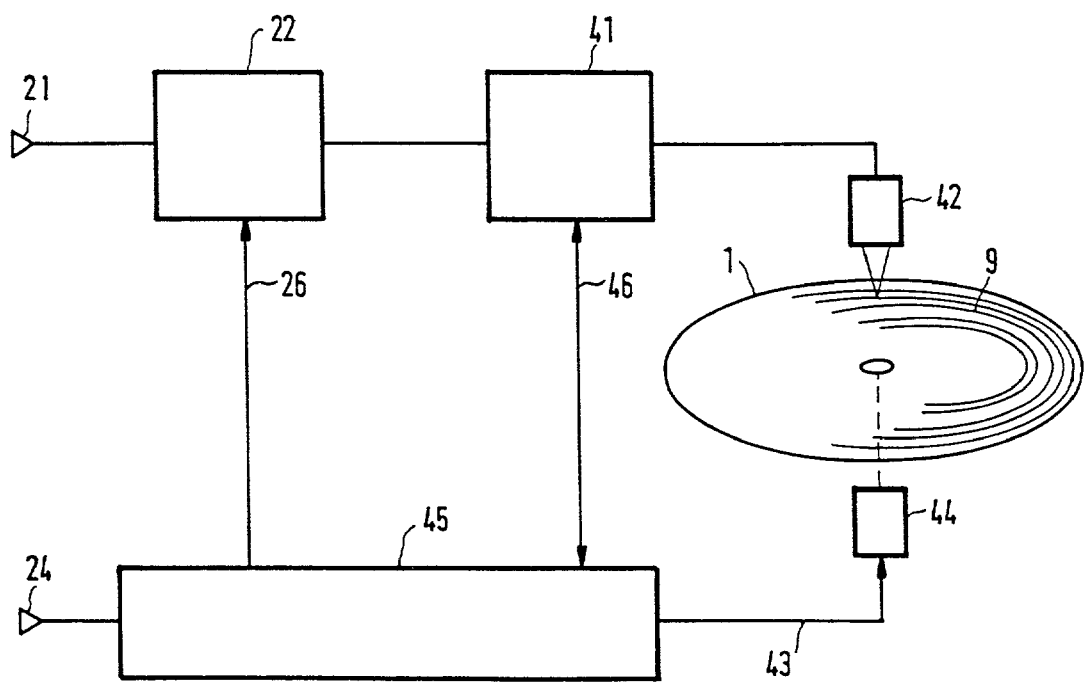
FIG. 4 shows a recording device.

FIG. 4 shows a recording device according to the invention for recording the disc-shaped information carrier 1. The device includes a compression unit 22 and a read/write unit 41 and a read/write head 42 for recording information on the information carrier 1. Information is fed through input 21 and converted in the compression unit 22 into an encoded signal which is subsequently converted into a write signal in the read/write unit 41. The write signal is coupled to the read/write head 42. The information carrier 1 rotates driven by driving apparatus 44 which in turn is controlled via a motor signal 43 by the system controller 45. The read/write head 42 scans the track 9 with a beam and reads/writes herein patterns of marks that represent the information such as, for example, with the CD. Information read out and relating to the data space is applied to the system controller 45 by a signal bus 46. During the scanning operation, the read/write head 42 is positioned over the track 9 by a servo system of a customary type (not shown). The system controller 45 checks the scanning of the information carrier 1 via the driving apparatus 44 and the servo system. After an information carrier 1 has been inserted into the device, the system controller 45 reads via the read/write head 42 and the read/write unit 41 directory information from the information carrier which directory information is indicative of the available data space. If part of the information carrier has already been recorded previously, this part may be maintained or at the user's command be released for a new recording. If the information carrier as a whole is available, the size of the data space may also be derived from the type of the information carrier, for example, indicated on a separate position on the information carrier by a bar code. It is also possible, for information relating to the data space to be contained in a servo pattern already introduced on the information carrier during manufacture, for example, in a wobble of the pregroove on a CD Recordable. The information relating to the duration is fed through time input 24 as is customary, for example, in a video recorder for entering start and end times of a program to be recorded. The system controller 45 may add a margin to the duration information thus fed, to level off peaks in the bit rate in a last part of the program and/or for the program overrunning its time. By adding a margin to the expected duration and using this total duration for adjusting the bit rate, space is available for storing more data than expected. For example, in a complex final scene in the last minute of a video program, the bit rate would have to be unproportionally restricted if not more than exactly the space for an average last minute is available. The overrunning of time of a program may be announced, for example, by the respective source, such as, for example, via the PDC (Program Delivery Code) system in which a television transmitter co-transmits via the transmitted signal time information relating to altered start and end times.

The invention may likewise be applied to rewritable information carriers of a different type from the disc-shaped type such as, for example, optical or magnetic tape, which can be written linearly or via helical scan. For implementing the invention, it must be possible to determine the available data space. At least the beginning of the empty space and the length thereof or the end are to be determined by a recording device. Alternatively, the user may indicate a certain free area. During the encoding process, the encoding device itself can update the generated quantity of data and therefore knows the remaining empty space. On the disc-shaped information carrier, such as a CD or a magnetic hard disk, the data space may be derived from address information. The invention may also be applied to information carriers on which the position along the track is established differently, such as, for example, via patterns or an auxiliary track previously recorded on the information carrier.

Information carriers of this type include a part intended for being recorded and having a specific data storage capacity. This data storage capacity may be available fully or in part for storing a program. The quantity of data that may still be recorded on the carrier also depends on the data previously recorded (in so far as it has to be saved). On some information carriers, for example the CD-E, the total data space is known per type. In certain recording systems a Table Of Contents (TOC) or Directory (for example, according to ISO 9660) is recorded on the information carrier, that indicates the space that is still left for storing data. With respect to tape-like information carriers, the data space available for data storage may also be derived from the total tape length and/or the position of previously recorded programs.

In lieu of directly being recorded, the encoded signal may be distributed via other media, such as a network or satellite broadcast. In that case too it may be important to keep the total quantity of encoded data of a program within a predefined maximum for which the encoding device according to the invention is then used. For the respective distribution media it is then advantageous that the total required transmission capacity continues to be within predefined boundaries.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims.

The invention claimed is:

1. An encoding device comprising:
a compression unit for encoding a signal representing a video program of a predefined duration into compressed digital data with a variable bit rate; and
system controller means for controlling the compression unit for adjusting during the encoding, the bit rate of the digital data for fitting the program in a predetermined data space which is available for the program depending on: a remaining part of the data space determined during the encoding, a remaining part of the duration of the program determined during the encoding, and a complexity of at least a part of the program.

2. A recording device comprising:
recording means for recording digital data on the information carrier having a predetermined data space available for recording;
a compression unit for encoding a signal representing a video program of a predefined duration into digital data;
data space means for determining during the encoding, the remaining part of the data space;
duration means for determining during the encoding, the remaining part of the duration of the video program;
data space means for determining during the encoding, the complexity of at least a part of the video program; and
system controller means for controlling the compression unit for adjusting during the encoding the bit rate of the digital data for fitting the program in the data space depending on: the remaining part of the data space determined during the encoding; the remaining part of the duration of the video program determined during encoding; and the complexity of at least a part of the video program.

3. A method of encoding comprising the steps of:
receiving a signal that represents a video program of a predefined duration;
encoding to convert the signal into compressed digital data with a bit rate adjusted for fitting the program into a predetermined data space which is available for the program;
determining during the encoding, a remaining part of the memory space;
determining during the encoding, a remaining part of the duration of the video program;
determining during the encoding, the complexity of at least a part of the video program; and
adjusting settings of the compression process for adjusting during the encoding the bit rate depending on: the remaining part of the data space determined during encoding, the remaining part of the duration determined during encoding, and the complexity of at least a part of the program determined during encoding.

4. Apparatus for programming a programmable controller to provide programmed structures to control a compression unit to influence a bit rate of a program of predefined duration, comprising:
means for providing programmed structures for determining during the encoding, a remaining part of the memory space;
means for providing programmed structures for determining during the encoding, a remaining part of the duration of the video program;
means for providing programmed structures for determining during the encoding, the complexity of at least a part of the video program; and means for providing programmed structures for adjusting settings of the compression process for adjusting during the encoding the bit rate depending on: the remaining part of the data space determined during encoding, the remaining part of the duration determined during encoding, and the complexity of at least a part of the program determined during encoding.

5. The encoding device of claim 1 wherein the system controller means controls the compression unit to set compression in accordance with the complexity for the at least a part of the program by increasing compression for more complex parts of the program.

6. The encoding device of claim 5 wherein the system controller means computes a new value for the bit rate in response to more complex of the parts of the program being encoded with increased compression.

7. The encoding device of claim 1 wherein the compression unit employs a variable bit rate in accordance with program signal contents.

8. The recording device of claim 2 wherein the system controller means controls the compression unit to set compression in accordance with the complexity for the at least a part of the program by increasing compression for more complex parts of the program.

9. The recording device of claim 8 wherein the system controller means computes a new value for the bit rate in response to more complex of the parts of the program being encoded with increased compression.

10. The recording device of claim 2 wherein the compression unit employs a variable bit rate in accordance with program signal contents.

11. The method of claim 3 wherein the adjusting of the settings of the compression process further comprises adjusting the settings in accordance with the complexity for the at least a part of the program by increasing compression for more complex parts of the program.

12. The method of claim 11 wherein the adjusting of the settings of the compression process further comprises computing a new value for the bit rate in response to more complex of the parts of the program being encoded with increased compression.

13. The method of claim 3 wherein the adjusting of the settings of the compression process further comprises varies bit rates in accordance with program signal contents.

14. The apparatus for programming a programmable controller of claim 4 wherein the means for providing programmed structures for adjusting the settings of the compression process further comprises means for adjusting the settings in accordance with the complexity for the at least a part of the program by increasing compression for more complex parts of the program.

15. The apparatus for programming a programmable controller of claim 14 wherein the adjusting of the settings of the compression process further comprises computing a new value for the bit rate in response to more complex of the parts of the program being encoded with increased compression.

16. The apparatus for programming a programmable controller claim 4 of wherein the adjusting of the settings of the compression process further comprises varying the bit rates in accordance with program signal contents.

17. An encoding device comprising:
a compression unit for encoding a signal representing a video program of a predefined duration into compressed digital data with a variable bit rate; and
system controller means for controlling the compression Unit for adjusting, during the encoding, the bit rate of the digital data, for limiting the amount of encoded data to less than a predetermined amount of encoded data to represent the program, the adjusting depending on: a remaining part of the predetermined amount determined during the encoding, a remaining part of the duration of the program determined during the encoding, and a complexity of at least a part of the program.

18. A method of encoding comprising the steps of:
receiving a signal that represents a video program of a predefined duration;
encoding to convert the signal into compressed digital data with a bit rate adjusted for limiting the size of the encoded data representing the program to less than a predetermined amount of encoded data;
determining during the encoding, a remaining part of the predetermined amount of encoded data;
determining during the encoding, a remaining part of the duration of the video program;
determining during the encoding, the complexity of at least a part of the video program; and
adjusting settings of the compression process for adjusting during the encoding the bit rate depending on: the remaining part of the predetermined amount of data, determined during encoding, the remaining part of the duration determined during encoding, and the complexity of at least a part of the program determined during encoding.

19. An encoding device for encoding a signal, the signal representing a program of a predefined duration, and the encoding device comprising a compression unit for compressing the signal to digital data, and a system controller for controlling the compression unit for influencing the bit rate of the digital data for fitting the program in a data space which is available for the program in dependence on a remaining part of the data space and a remaining part of the duration established during encoding, characterized in that the system controller is arranged for setting the compression unit in dependence on a program complexity of the actual program.

20. The encoding device as claimed in claim 19, characterized in that the system controller is arranged for establishing the program complexity in dependence on en actual bit rate during a previously encoded part of the program.

21. The encoding device as claimed in claim 20, characterized in that the system controller is arranged for establishing the program complexity in dependence on peaks and valleys or variation of the actual bit rate during a previously encoded part of the program.

22. The encoding device as claimed in claim 19, characterized in that the system controller is arranged for establishing the program complexity in dependence on a program type.

23. The encoding device as claimed in claim 19, characterized in that the system controller is arranged for determining the duration in dependence on an expected duration of the program and a margin for leveling off peaks in the bit rate in a last part of the program and/or for the program overrunning its time.

24. A recording device for recording a signal on an information carrier , the signal representing a program of a predefined duration, the information carrier having a vacant data space available for recording the program, and the device comprising recording means for recording a digital bit stream on the information carrier and means for establishing the predefined duration, characterized in that the recording device comprises an encoding device as claimed in claim 19.

25. A method of encoding a signal that represents a program of a predefined duration, the signal being converted by a compression process into digital data with a bit rate influenced for fitting the program in a vacant data space which is available for the program, in which method a remaining part of the vacant memory space and a remaining part of the duration are determined during the encoding process and the bit rate is influenced by settings of the compression process in dependence on the remaining part of the vacant data space and the remaining part of the duration, characterized in that the compression process is set in dependence on a program complexity of the actual program.

26. The method as claimed in claim 25, characterized in that the program complexity is established in dependence on an actual bit rate during a previously encoded part of the program.

27. The method as claimed in claim 25, characterized in that the program complexity is established in dependence on peaks and valley or variation of the actual bit rate during a previously encoded part of the program.

28. The method as claimed in claim 25, characterized in that the program complexity is established in dependence on a program type.

29. The method as claimed in claim 25, characterized in that the duration is determined in dependence on an expected duration of the program and a margin for leveling off peaks in the bit rate in a last part of the program and/or for the program overrunning its time.

30. The encoding device as claimed in claim 19, wherein:
the system controller is arranged for establishing the program complexity in dependence on peaks and valleys or variation of the actual bit rate during a previously encoded part of the program;
the system controller is arranged for establishing the program complexity in dependence on a program type; and
the system controller is arranged for determining the duration in dependence on an expected duration of the program and a margin for leveling off peaks in the bit rate in a last part of the program and/or for the program overrunning its time.

31. The recording device as claimed in claim 24, wherein:
the system controller is arranged for establishing the program complexity in dependence on peaks and valleys or variation of the actual bit rate during a previously encoded part off the program;
the system controller is arranged for establishing the program complexity in dependence on a program type; and
the system controller is arranged for determining the duration in dependence on an expected duration of the program and a margin for leveling off peaks in the bit rate in a last part of the program and/or for the program overrunning its time.

32. The method as claimed in claim 25, wherein
the program complexity is established in dependence on peaks and valleys or variation of the actual bit rate during a previously encoded part of the program;
the program complexity is established in dependence on a program type;
the duration is determined in dependence on an expected duration of the program and a margin for leveling off peaks in the bit rate in a last part of the program and/or for the program overrunning its time.

* * * * *